(12) United States Patent
Abelard et al.

(10) Patent No.: US 8,644,681 B2
(45) Date of Patent: Feb. 4, 2014

(54) DEVICE AND METHOD FOR DELAYED READING OF DIGITAL VIDEO DATA

(75) Inventors: Franck Abelard, Saint Armel (FR); Serge Defrance, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 671 days.

(21) Appl. No.: 10/522,111

(22) PCT Filed: Jul. 8, 2003

(86) PCT No.: PCT/EP03/07328
§ 371 (c)(1), (2), (4) Date: Jan. 25, 2005

(87) PCT Pub. No.: WO2004/014072
PCT Pub. Date: Feb. 12, 2004

(65) Prior Publication Data
US 2005/0244130 A1 Nov. 3, 2005

(30) Foreign Application Priority Data

Jul. 26, 2002 (FR) ...................................... 02 09787

(51) Int. Cl.
*H04N 5/93* (2006.01)
*H04N 5/783* (2006.01)

(52) U.S. Cl.
USPC .......................................... 386/278; 386/343

(58) Field of Classification Search
None
See application file for complete search history.

(56) References Cited

U.S. PATENT DOCUMENTS

| | | | |
|---|---|---|---|
| 6,411,770 B1 | 6/2002 | Ito et al. | |
| 6,535,920 B1 * | 3/2003 | Parry et al. | 709/231 |
| 6,658,439 B2 * | 12/2003 | Karasudani | 386/241 |
| 6,892,285 B1 * | 5/2005 | Key et al. | 711/154 |
| 6,934,464 B1 | 8/2005 | Ayaki et al. | |

FOREIGN PATENT DOCUMENTS

| | | |
|---|---|---|
| EP | 0975160 A2 | 1/2000 |
| EP | 1058256 A1 | 12/2000 |
| EP | 1185095 | 3/2002 |
| JP | 200082279 | 3/2000 |
| JP | 2000187939 | 7/2000 |

OTHER PUBLICATIONS

Search Report Dated Dec. 10, 2003.

* cited by examiner

*Primary Examiner* — Heather Jones
(74) *Attorney, Agent, or Firm* — Robert D. Shedd; Reitseng Lin (57) ABSTRACT

The invention relates to a method of delayed reading of digital video data stored in a file on a recording medium. According to the method, a fixed quantity of the storage resources of the recording medium is allocated to the file storing these data application to digital decoders.

22 Claims, 3 Drawing Sheets

DEVICE AND METHOD FOR DELAYED READING OF DIGITAL VIDEO DATA

This application claims the benefit, under 35 U.S.C. §365 of International Application PCT/EP03/07328, filed Jul. 8, 2003, which was published in accordance with PCT Article 21(2) on Feb. 12, 2004 in English and which claims the benefit of French patent application No. 0209787, filed Jul. 26, 2002.

FIELD OF THE INVENTION

The present invention concerns a method and a device for delayed reading of digital video data.

BACKGROUND OF THE INVENTION

Video documents coded in the form of digital data offer numerous processing possibilities.

The invention relates more particularly to the delayed reading of data recorded on a recording medium, which consists in recording a program on a recording medium in a file, while simultaneously reading out this program with a certain delay. This application allows the user to suspend the readout of the program when he so wishes and to resume readout from where he halted it.

The known devices, in particular devices of digital television decoder type, making it possible to implement methods of delayed readout exhibit numerous drawbacks.

Among these known devices, some of them propose methods in which the quantity of storage resources that is allocatable to a file other than the delayed readout file depends on the other applications performed by the device. This gives rise to numerous drawbacks:

On the one hand, the delayed reading file can no longer harness new resources to continue the storage of data.

On the other hand, the storage capacity allocated to the delayed reading method being uncontrolled, it is possible that this method may occupy too big a quantity of storage data of the decoder, thus generating malfunctions of the latter, for example to perform other applications unable to access a required-storage capacity.

Additionally, when the delayed reading method is used simultaneously with other applications requiring data storage, the management of the storage space allocated to each application proves to be complex and difficult. Specifically, an optimal allocation of cells to a file allocates successive cells, in particular so as to limit the movements of the head.

Other known methods of delayed reading use management of circular buffers. Such management of buffers gives rise to disorderly storage of the data.

SUMMARY OF THE INVENTION

The present invention remedies at least one of these drawbacks. It results from the finding that storage resources of a recording medium may be allocated permanently to a file, independently of the resources actually required by this file. Hence, the invention relates to a method of storing digital data in a recording medium, characterized in that a fixed quantity of resources of this random access memory is allocated to a file independently of the quantity of resources required by an application associated with this file.

More precisely, the invention relates to a method of delayed reading of digital video data stored in a file on a recording medium characterized in that a fixed quantity of the storage resources of the recording medium is allocated to the file storing these data.

Thus, it may be possible to control the quantity of resources that is allocated to the delayed reading file without disturbing the operation of the device.

The quantity of resources can be allotted on initialization of the recording medium, or possibly subsequently if the initial configuration is not satisfactory for the user.

According to a preferred embodiment, the data being stored continuously on the recording medium, a reading window is defined for these data such that stored data can be read only during a specified lag following their storage.

The stored data may be read for a well-determined time in such a way that obsolete data is not read.

According to a preferred embodiment, the resources of the recording medium being managed by a file controller allotting resources by means of cells, characterized in that a fixed quantity of cells delimited by a start of file cell and by an end of file cell is associated with the file for storing these data.

According to a preferred embodiment, when the end of file cell is used to store data, the start of file cell is deallocated, a new end of file cell being allocated to this file.

In this way, memory is regularly reallocated in respect of the delayed reading file as and when the data are read, this perhaps making it possible to have a reading window of constant size.

According to a preferred embodiment, when the end of file cell is used to store data, the set of the cells that are distant from the end of file cell by a specified quantity of data is deallocated from the file and reallocated as cells consecutively following the end of file cell.

According to this embodiment, the cells are not reallocated one by one but in a more global manner by allocating and deallocating areas whose size is greater than a cell.

According to a preferred embodiment, separate means of writing or of reading data are used.

According to a preferred embodiment, the means of reading or of writing comprise, respectively, write or read pointers characterized in that the write pointer precedes the read pointer for every cell of a file.

In this way, the data read are valid data.

According to a second aspect, the invention also relates to a device for delayed reading of digital video data stored on a recording medium, characterized in that it comprises means for allocating a fixed quantity of the storage resources of the recording medium to the file storing these data, the said device preferably being adapted to implement a method according to one of the embodiments of the invention.

According to a third aspect, the invention also relates to a computer program product comprising program code instructions for the execution of the steps of the method of delayed reading of digital video data according to one of claims 1 to 7, when the said program is executed on a computer.

Although a permanent allocation such as this blocks the use of storage resources of the recording medium, it remedies the drawbacks of excessive expanse or of lack of resources in respect of the delayed reading file since such a method limits the size of the delayed reading file, the number of cells allocated to other files being known.

As a corollary, the file size allocated to the time shifting function being determined, this function is always possible by virtue of the invention.

The invention also results from the finding that a file controller managing the allocation of the storage resources of a random access memory by means of cells makes it possible to use a so-called deallocation command that makes it possible to eliminate the correspondence between a file and a cell.

Other characteristics and advantages of the invention will become apparent with the description given hereinbelow, without limitation, while referring to the following figures:

DETAILED DESCRIPTION OF THE PREFERRED EMBODIMENTS

Figure 1:
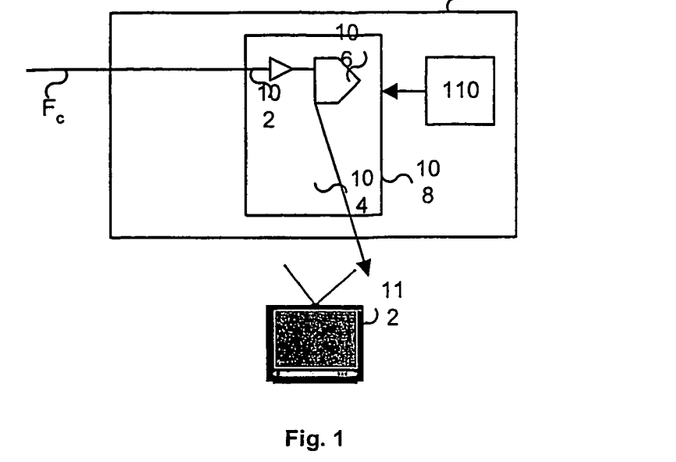
FIG. 1 is a schematic relating to the operation of a known decoder of digital video data performing a method of delayed reading.

FIG. 1 represents a continuous stream $F_c$ of digital video data coding a documentary. A user furnished with a display terminal 112, connected to a decoder 100 receiving this stream $F_c$, can interrupt the display of the documentary during an absence, resuming this display on his return so as to see the entire documentary.

Similarly, this user can speed up the playing of the documentary so as to avoid a boring section or reverse the direction of play of the documentary so as to view a section again.

To carry out such operations, the decoder 100 can comprise means 102 of storing digital video data and means 104 of reading these stored data, such as applications, which control a head 106 storing and reading data in a storage unit 108 of the decoder. The storage unit of the decoder consists for example of a recording medium such as a hard disk or an optical disk.

Stated otherwise, the decoder comprises a write pointer 102 controlling the movement of the head 106 for the storage of data and a pointer 104 controlling the movement of the head 106 for the reading of data.

With the aid of these write 102 or read 104 pointers, the decoder can thus perform a buffer function such that data stored by the write pointer 102 are read, with a specified delay, by the read pointer 104, this method being dubbed subsequently delayed reading.

Hence, when the user of the terminal wishes to speed up the playing of the documentary, the read pointer 102 can instruct the head 106 so that the reading of the data of the unit 108 is speeded up. As a consequence, the delay between the storing of a data item by the pointer 102 and its reading by the pointer 104 decreases.

Furthermore, when the user of the decoder wishes to suspend the displaying of data, the read pointer 102 can be halted, so that no new data item is transmitted to the display terminal 112 while the pointer 104 continues to store new data emanating from the stream $F_c$.

Finally, when the user of the terminal wishes to view a section of the documentary again, the read pointer can be moved towards stored data already read so as to perform a readout of this data.

The decoder 100 can comprise a file controller 110 allocating the storage resources of the unit 108 by means of clusters, or cells, as described with the aid of Table 1 (Annex 1) wherein are represented such cells i (1, 2, 3, ..., 468).

Each cell i corresponds to a specified quantity of the resources of the storage unit 108 of the decoder. Thus, by allocating a cell i to a file such as the delayed reading file, this file is afforded the resources corresponding to this cell i.

Each cell i comprises means for determining the file to which the resources corresponding thereto are allocated. In Table 1, the cells allocated to one and the same file are represented in identical manner, four separate categories of cells being represented:

According to a first category corresponding to cells 5 to 7, 24 to 30, 39 to 44, 352 to 383 and 422 to 429, cells are accessible so as to be allocated to a new file. Stated otherwise, these cells are available.

According to a second category corresponding to the cells 1 to 4, 8 to 23, 31 to 38, 45 to 62, 195 to 236, 384 to 421 and 430 to 488, cells are allocated to a separate file from the delayed reading file. These cells cannot therefore be allocated to this latter file.

According to a third category, corresponding to cells 63 to 154 and 298 to 351, cells allocated to the delayed reading file are accessible to the read pointer whereas, according to a fourth category corresponding to the data 155 to 194 and 237 to 297, cells allocated to the delayed reading file are not accessible to the read pointer.

Specifically, when data are stored in the delayed reading file, they are accessible to the read pointer only during a specified lag after which their reading is blocked. Thus, the reading of data relating to other uses of the method of delayed reading is avoided in particular.

Additionally, the controller 110 determines the order in which the cells are allocated to a file, this order subsequently determining the order of reading of the cells.

It ought to be pointed out that a file is defined by a first cell, dubbed the start of file cell, and by a last cell, dubbed the end of file cell.

As indicated above, a predetermined gap is maintained between the read and write pointers. To do this, they are spaced apart by a specified quantity of data corresponding to this gap.

Figure 2A:
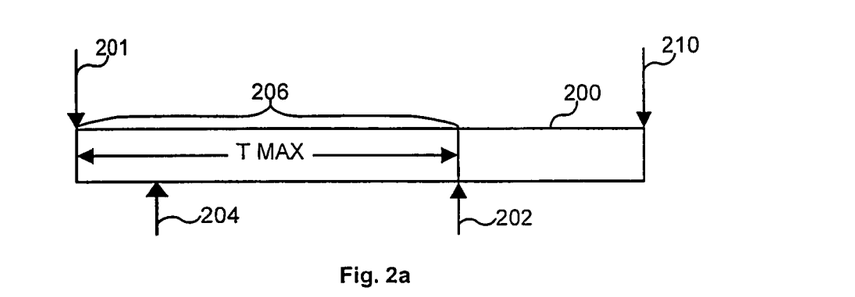
FIGS. 2a, 2b and 2c represent a first variant of the invention.
Figure 2B:
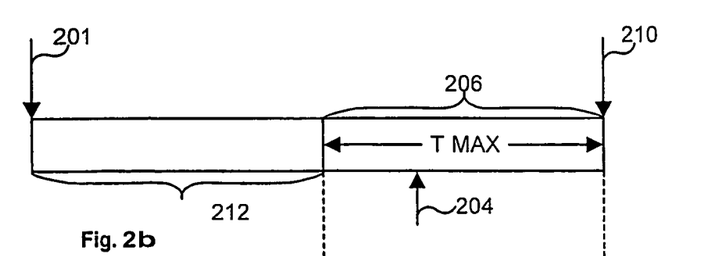
Figure 2C:
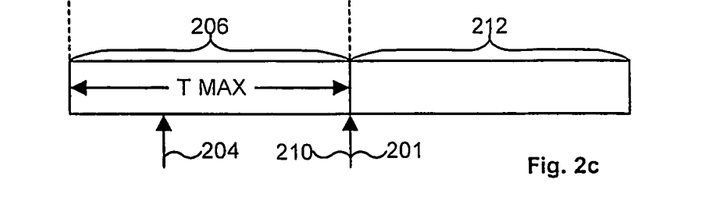

FIGS. 2a, 2b and 2c represent a first variant of the invention.

In accordance with the invention, the embodiments of the invention that are described hereinbelow relate to a method of delayed reading of digital video data stored in a recording medium, a file 200 (FIG. 2a) of fixed size being used to store these data.

Write 202 and read 204 pointers are used to, respectively, store the video data in this file 200 and read them so as to transmit them to a display terminal.

In order to ensure that the read pointer 204 accesses data relating to the document recorded by the write pointer 202, the latter is obliged to be positioned over a cell prior to the cell over which the read pointer is positioned, that is to say that the read pointer cannot access cells not previously accessed by the write pointer.

Additionally, a delay $T_{max}$ is defined such that data stored in the delayed reading file are not accessible to the read pointer after such a delay $T_{max}$ has elapsed since their recording.

One thus defines a maximum limit relating to the quantity Q of data that can be situated between the write pointer and the read pointer, this quantity corresponding to the delay $T_{max}$ considered. The determination of the quantity Q is explained later.

Stated otherwise, a reading window 206 covering the cells accessible to the read pointer is formed.

Hence, as shown in FIG. 2b, as and when new video data are stored by the write pointer 202, the latter moves in the file 200 towards the end of file cell 210. Similarly, the reading window 206 moves inside the file towards this end of file cell 210.

When the read pointer is an obsolete read area, the former must be moved.

According to a first embodiment of the invention, when this cell 210 is reached by the write pointer, the entire set 212 of the cells of the file 200 which do not lie in the reading window are deallocated at the start of the file 200, then reallocated to this file as cells successive to the cell 210. For example, the start of file cell 201 in FIGS. 2a and 2b is considered, in FIG. 2c, as a cell of the file 200 posterior to the cell 210.

Thus, the write pointer is afforded new cells, posterior to the cell 210, for storing new data, without requiring an increase in the resources allocated to the file.

It ought to be pointed out that, when cells are deallocated, the recording medium should not perform any operation liable to allot a cell temporarily deallocated to a file other than the file relating to the delayed reading.

According to a second embodiment, when the reading window reaches the end of file cell, as described in FIG. 2b, the deallocation and the allocation of a single cell of the random access memory is performed, as described hereinbelow with the aid of Tables 2 to 7 (annexed) which represent the cells used by a file controller operating according to this embodiment of the invention.

Represented in Table 2 is a file controller in accordance with second embodiment of the invention, a predetermined quantity of cells being preallocated to the delayed reading file. More precisely, the cells 188 to 230, 273 to 351 and 63 to 187 have already been allocated to this file, the cell 188 being the start cell of the file whereas the cell 187 is the end cell of this file.

It ought to be pointed out that these cells are considered to be inaccessible to the read pointer since they relate to data stored during a previous operation.

When the storage of data specific to a new use of the method of delayed reading starts, cells of the file relating to this method are used to store these new data.

These cells, which then become accessible to the read pointer, are allocated successively onwards of the start of file cell (188) in such a way as to store the data in the order of reading of the file.

Thus, at a given instant (Table 3), 48 cells (188 to 230 and 273 to 277) are associated with the data of the new use of the method of delayed reading, and are moreover accessible to the read pointer since they lie in a reading window defined by a delay Tmax as described earlier.

In this example, the delay Tmax of the reading window has been determined as the equivalent of 104 cells. Hence, the storing of the data continues until the number Q of accessible cells (188 to 230 and 273 to 333, Table 4) of the delayed reading file reaches this size of cells.

When the time Tmax has elapsed, the reading window moves as described with the aid of FIGS. 2a and 2b inside the delayed reading file.

For example, cells 334, 335, 336 and 337 are successively made accessible to the read pointer while cells 188, 189, 190 and 191 are successively made inaccessible to the read pointer.

Such a method is performed successively until the last cell made accessible is the last cell 187 allocated to the shift file (Table 6a).

At this instant, Table 6b, a new cell 5 is allocated to the shift file in parallel with the deallocation of the first cell 188 of this file, the new cell 5 then being considered to be the new end cell of the shift file. The cells are progressively deallocated up to cell 201 and cells 5 to 10, 24 to 30, 39 and so on are allocated.

By virtue of such an operation, the number of cells allocated to the shift file is kept constant. Moreover, the recording of the data stored in the shift file in a conventional recording mode is made easier, as shown with the aid of Table 7 where the entire set of cells allotted to the time shift file is represented.

Figure 3:
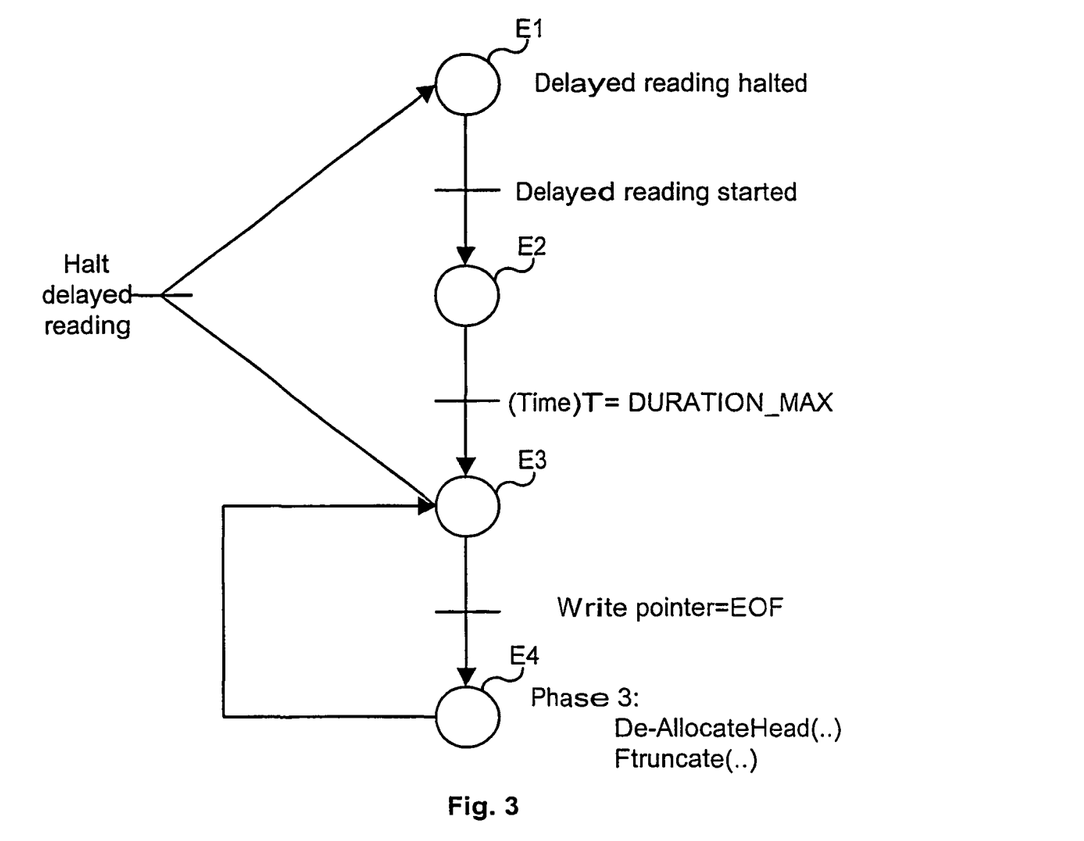
FIG. 3 represents a first mode of implementation of the method according to the invention.

In FIG. 3, in step E1, the delayed reading application has not yet been instigated. When the delayed reading application is instigated, at the time T, we go to step E2.

During this step E2, the file reserved for delayed reading is opened for writing to the recording medium and the write pointer is positioned at the start of the file. The data contained in this file, which originate from a previous recording, and which are situated between the write pointer and the end of the file must not be able to be read out. Care is therefore taken to ensure that the read pointer FS_GetReadPosition(File) does not overtake the write pointer, FS_GetWritePosition (File). To do this, before each read, the following condition is checked to verify whether it is true:

$$FS\_GetWritePosition(File) - FS\_GetReadPosition(File) > 0$$

The duration of step E2 is defined by the parameter DURATION_MAX imposed by the application. Specifically, on initializing the system, the application requests the ability to undertake delayed reading corresponding to a duration, for example of 30 minutes. To this time there corresponds a quantity of recorded data occupying a space on the recording medium.

On initializing the system or on formatting the disk, a memory area of size SIZE_MAX is reserved for the delayed reading file. If the quantity of data recorded over the duration required by the user is greater than SIZE_MAX, the application can request that the lag of a delayed reading be less than SIZE_MAX.

We then go to step E3 in which we check that the delayed reading application does not read obsolete data, that is to say data stored before a duration Tmax in the file, namely:

$$FS\_GetWritePosition(File) - FS\_GetReadPosition(File) < Tmax$$

From step E3 we go to step E1 when the delayed reading application is suspended.

Otherwise we go to step E4, a transitional step during which the file is rapidly restructured before going back to step E3. Step E4 starts when the entire set of readable data is again at the end of the file, that is to say when the write pointer has reached the start of file value plus SIZE_MAX.

In step E4, the clusters containing the unreadable data at the start of the file are deallocated with the aid of the command:

Quantity-deallocated=FS-deallocateHead (File, SIZE_MAX−Tmax)

This command takes as parameter a size which may be a number of bytes. Since the unit of allocation of the file system is a cluster, the parameter SIZE_MAX−Tmax can be rounded to the largest multiple of the size of a cluster. The exact number of deallocated bytes may then be returned via the command.

The size of the data transfers in the case of data of transport type (TS), for example complying with the MPEG-2 standard, during access to the recording medium is much the same as the maximum size of the ultraDMA proposed by the ATA interface (the acronym standing for "Advanced Technology Attachment").

This same quantity of clusters is then immediately reallocated at the end of the file with the aid of the command FS_truncate (file, Qtydeallocated)

It is necessary to ensure that between these two calls, no other client accesses the disk.

The method of delayed readout can then go back to step E3. The readable data occupy the start of the file and the unreadable data are at the end.

Figure 4:
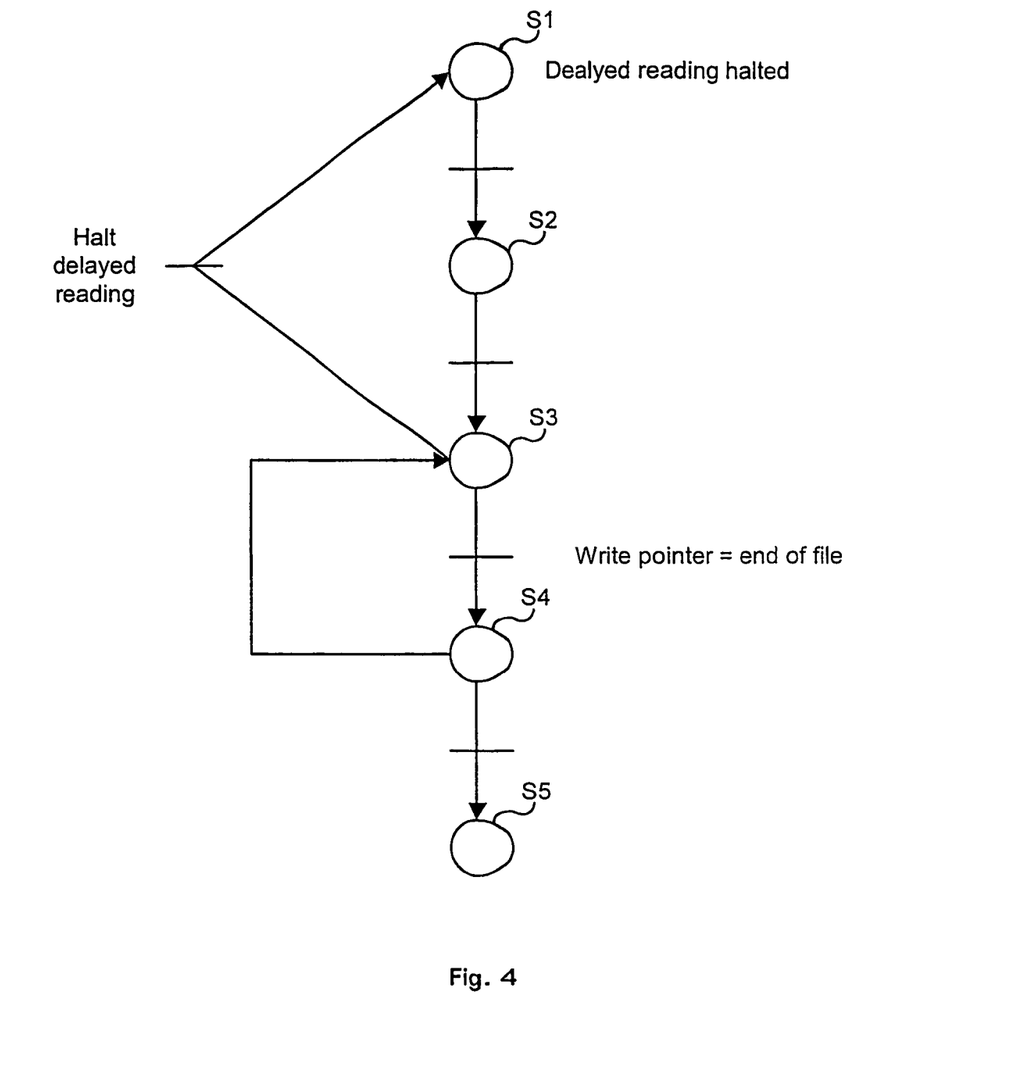
FIG. 4 represents a second mode of implementation of the method according to the invention.

FIG. 4 represents another variant of an embodiment of the invention.

Steps S1 to S3 correspond respectively to steps E1 to E3.

In the course of step S4, and before each new write access, the command FS_DeallocateHead is called so as to release the clusters at the start of the file. In this way, one does not wait for the write pointer to have reached the end of the file before deallocating the clusters of the start but deallocation is carried out as and when the file is written to.

In the course of step S4, we go back to step S1 when the delayed reading application is halted. Otherwise, we go to step S5 in which we switch back to standard recording mode, that is to say with no delayed reading application.

In this case, the switch to standard recording mode is achieved easily since the application does not erase a large quantity of data simultaneously but progressively and when the user switches back to normal recording mode, a large quantity of data has already been stored.

TABLE 1

| 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|
| 19 | 20 | 21 | 22 | 23 | 24 | 25 | 26 | 27 | 28 | 29 | 30 | 31 | 32 | 33 | 34 | 35 | 36 |
| 37 | 38 | 39 | 40 | 41 | 42 | 43 | 44 | 45 | 46 | 47 | 48 | 49 | 50 | 51 | 52 | 53 | 54 |
| 55 | 56 | 57 | 58 | 59 | 60 | 61 | 62 | 63 | 64 | 65 | 66 | 67 | 68 | 69 | 70 | 71 | 72 |
| 73 | 74 | 75 | 76 | 77 | 78 | 79 | 80 | 81 | 82 | 83 | 84 | 85 | 86 | 87 | 88 | 89 | 90 |
| 91 | 92 | 93 | 94 | 95 | 96 | 97 | 98 | 99 | 100 | 101 | 102 | 103 | 104 | 105 | 106 | 107 | 108 |
| 109 | 110 | 111 | 112 | 113 | 114 | 115 | 116 | 117 | 118 | 119 | 120 | 121 | 122 | 123 | 124 | 125 | 126 |
| 127 | 128 | 129 | 130 | 131 | 132 | 133 | 134 | 135 | 136 | 137 | 138 | 139 | 140 | 141 | 142 | 143 | 144 |
| 145 | 146 | 147 | 148 | 149 | 150 | 151 | 152 | 153 | 154 | 155 | 156 | 157 | 158 | 159 | 160 | 161 | 162 |
| 163 | 164 | 165 | 166 | 167 | 168 | 169 | 170 | 171 | 172 | 173 | 174 | 175 | 176 | 177 | 178 | 179 | 180 |
| 181 | 182 | 183 | 184 | 185 | 186 | 187 | 188 | 189 | 190 | 191 | 192 | 193 | 194 | 195 | 196 | 197 | 198 |
| 199 | 200 | 201 | 202 | 203 | 204 | 205 | 206 | 207 | 208 | 209 | 210 | 211 | 212 | 213 | 214 | 215 | 216 |
| 217 | 218 | 219 | 220 | 221 | 222 | 223 | 224 | 225 | 226 | 227 | 228 | 229 | 230 | 231 | 232 | 233 | 234 |
| 235 | 236 | 237 | 238 | 239 | 240 | 241 | 242 | 243 | 244 | 245 | 246 | 247 | 248 | 249 | 250 | 251 | 252 |
| 253 | 254 | 255 | 256 | 257 | 258 | 259 | 260 | 261 | 262 | 263 | 264 | 265 | 266 | 267 | 268 | 269 | 270 |
| 271 | 272 | 273 | 274 | 275 | 276 | 277 | 278 | 279 | 280 | 281 | 282 | 283 | 284 | 285 | 286 | 287 | 288 |
| 289 | 290 | 291 | 292 | 293 | 294 | 295 | 296 | 297 | 298 | 299 | 300 | 301 | 302 | 303 | 304 | 305 | 306 |
| 307 | 308 | 309 | 310 | 311 | 312 | 313 | 314 | 315 | 316 | 317 | 318 | 319 | 320 | 321 | 322 | 323 | 324 |
| 325 | 326 | 327 | 328 | 329 | 330 | 331 | 332 | 333 | 334 | 335 | 336 | 337 | 338 | 339 | 340 | 341 | 342 |
| 343 | 344 | 345 | 346 | 347 | 348 | 349 | 350 | 351 | 352 | 353 | 354 | 355 | 356 | 357 | 358 | 359 | 360 |
| 361 | 362 | 363 | 364 | 365 | 366 | 367 | 368 | 369 | 370 | 371 | 372 | 373 | 374 | 375 | 376 | 377 | 378 |
| 379 | 380 | 381 | 382 | 383 | 384 | 385 | 386 | 387 | 388 | 389 | 390 | 391 | 392 | 393 | 394 | 395 | 396 |
| 397 | 398 | 399 | 400 | 401 | 402 | 403 | 404 | 405 | 406 | 407 | 408 | 409 | 410 | 411 | 412 | 413 | 414 |
| 415 | 416 | 417 | 418 | 419 | 420 | 421 | 422 | 423 | 424 | 425 | 426 | 427 | 428 | 429 | 430 | 431 | 432 |
| 433 | 434 | 435 | 436 | 437 | 438 | 439 | 440 | 441 | 442 | 443 | 444 | 445 | 446 | 447 | 448 | 449 | 450 |
| 451 | 452 | 453 | 454 | 455 | 456 | 457 | 458 | 459 | 460 | 461 | 462 | 463 | 464 | 465 | 466 | 467 | 468 |

TABLE 2

[Table of numbered cells 1–468 with various cells shaded]

TABLE 3

| 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|
| 19 | 20 | 21 | 22 | 23 | 24 | 25 | 26 | 27 | 28 | 29 | 30 | 31 | 32 | 33 | 34 | 17 | 18 |
| 37 | 38 | 39 | 40 | 41 | 42 | 43 | 44 | 45 | 46 | 47 | 48 | 49 | 50 | 51 | 52 | 53 | 54 |
| 55 | 56 | 57 | 58 | 59 | 60 | 61 | 62 | 63 | 64 | 65 | 66 | 67 | 68 | 69 | 70 | 71 | 72 |
| 73 | 74 | 75 | 76 | 77 | 78 | 79 | 80 | 81 | 82 | 83 | 84 | 85 | 86 | 87 | 88 | 89 | 90 |
| 91 | 92 | 93 | 94 | 95 | 96 | 97 | 98 | 99 | 100 | 101 | 102 | 103 | 104 | 105 | 106 | 107 | 108 |
| 109 | 110 | 111 | 112 | 113 | 114 | 115 | 116 | 117 | 118 | 119 | 120 | 121 | 122 | 123 | 124 | 125 | 126 |
| 127 | 128 | 129 | 130 | 131 | 132 | 133 | 134 | 135 | 136 | 137 | 138 | 139 | 140 | 141 | 142 | 143 | 144 |
| 145 | 146 | 147 | 148 | 149 | 150 | 151 | 152 | 153 | 154 | 155 | 156 | 157 | 158 | 159 | 160 | 161 | 162 |
| 163 | 164 | 165 | 166 | 167 | 168 | 169 | 170 | 171 | 172 | 173 | 174 | 175 | 176 | 177 | 178 | 179 | 180 |
| 181 | 182 | 183 | 184 | 185 | 186 | 187 | 188 | 189 | 190 | 191 | 192 | 193 | 194 | 195 | 196 | 197 | 198 |
| 199 | 200 | 201 | 202 | 203 | 204 | 205 | 206 | 207 | 208 | 209 | 210 | 211 | 212 | 213 | 214 | 215 | 216 |
| 217 | 218 | 219 | 220 | 221 | 222 | 223 | 224 | 225 | 226 | 227 | 228 | 229 | 230 | 231 | 232 | 233 | 234 |

| 235 | 236 | 237 | 238 | 239 | 240 | 241 | 242 | 243 | 244 | 245 | 246 | 247 | 248 | 249 | 250 | 251 | 252 |
|---|---|---|---|---|---|---|---|---|---|---|---|---|---|---|---|---|---|
| 253 | 254 | 255 | 256 | 257 | 258 | 259 | 260 | 261 | 262 | 263 | 264 | 265 | 266 | 267 | 268 | 269 | 270 |
| 271 | 272 | 273 | 274 | 275 | 276 | 277 | 278 | 279 | 280 | 281 | 282 | 283 | 284 | 285 | 286 | 287 | 288 |
| 289 | 290 | 291 | 292 | 293 | 294 | 295 | 296 | 297 | 298 | 299 | 300 | 301 | 302 | 303 | 304 | 305 | 306 |
| 307 | 308 | 309 | 310 | 311 | 312 | 313 | 314 | 315 | 316 | 317 | 318 | 319 | 320 | 321 | 322 | 323 | 324 |
| 325 | 326 | 327 | 328 | 329 | 330 | 331 | 332 | 333 | 334 | 335 | 336 | 337 | 338 | 339 | 340 | 341 | 342 |
| 343 | 344 | 345 | 346 | 347 | 348 | 349 | 350 | 351 | 352 | 353 | 354 | 355 | 356 | 357 | 358 | 359 | 360 |
| 361 | 362 | 363 | 364 | 365 | 366 | 367 | 368 | 369 | 370 | 371 | 372 | 373 | 374 | 375 | 376 | 377 | 378 |
| 379 | 380 | 381 | 382 | 383 | 384 | 385 | 386 | 387 | 388 | 389 | 390 | 391 | 392 | 393 | 394 | 395 | 396 |
| 397 | 398 | 399 | 400 | 401 | 402 | 403 | 404 | 405 | 406 | 407 | 408 | 409 | 410 | 411 | 412 | 413 | 414 |
| 415 | 416 | 417 | 418 | 419 | 420 | 421 | 422 | 423 | 424 | 425 | 426 | 427 | 428 | 429 | 430 | 431 | 432 |
| 433 | 434 | 435 | 436 | 437 | 438 | 439 | 440 | 441 | 442 | 443 | 444 | 445 | 446 | 447 | 448 | 449 | 450 |
| 451 | 452 | 453 | 454 | 455 | 456 | 457 | 458 | 459 | 460 | 461 | 462 | 463 | 464 | 465 | 466 | 467 | 468 |

TABLE 4

| 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|
| 19 | 20 | 21 | 22 | 23 | 24 | 25 | 26 | 27 | 28 | 29 | 30 | 31 | 32 | 33 | 34 | 17 | 18 |
| 37 | 38 | 39 | 40 | 41 | 42 | 43 | 44 | 45 | 46 | 47 | 48 | 49 | 50 | 51 | 52 | 53 | 54 |
| 55 | 56 | 57 | 58 | 59 | 60 | 61 | 62 | 63 | 64 | 65 | 66 | 67 | 68 | 69 | 70 | 71 | 72 |
| 73 | 74 | 75 | 76 | 77 | 78 | 79 | 80 | 81 | 82 | 83 | 84 | 85 | 86 | 87 | 88 | 89 | 90 |
| 91 | 92 | 93 | 94 | 95 | 96 | 97 | 98 | 99 | 100 | 101 | 102 | 103 | 104 | 105 | 106 | 107 | 108 |
| 109 | 110 | 111 | 112 | 113 | 114 | 115 | 116 | 117 | 118 | 119 | 120 | 121 | 122 | 123 | 124 | 125 | 126 |
| 127 | 128 | 129 | 130 | 131 | 132 | 133 | 134 | 135 | 136 | 137 | 138 | 139 | 140 | 141 | 142 | 143 | 144 |
| 145 | 146 | 147 | 148 | 149 | 150 | 151 | 152 | 153 | 154 | 155 | 156 | 157 | 158 | 159 | 160 | 161 | 162 |
| 163 | 164 | 165 | 166 | 167 | 168 | 169 | 170 | 171 | 172 | 173 | 174 | 175 | 176 | 177 | 178 | 179 | 180 |
| 181 | 182 | 183 | 184 | 185 | 186 | 187 | 188 | 189 | 190 | 191 | 192 | 193 | 194 | 195 | 196 | 197 | 198 |
| 199 | 200 | 201 | 202 | 203 | 204 | 205 | 206 | 207 | 208 | 209 | 210 | 211 | 212 | 213 | 214 | 215 | 216 |
| 217 | 218 | 219 | 220 | 221 | 222 | 223 | 224 | 225 | 226 | 227 | 228 | 229 | 230 | 231 | 232 | 233 | 234 |

| 235 | 236 | 237 | 238 | 239 | 240 | 241 | 242 | 243 | 244 | 245 | 246 | 247 | 248 | 249 | 250 | 251 | 252 |
|---|---|---|---|---|---|---|---|---|---|---|---|---|---|---|---|---|---|
| 253 | 254 | 255 | 256 | 257 | 258 | 259 | 260 | 261 | 262 | 263 | 264 | 265 | 266 | 267 | 268 | 269 | 270 |
| 271 | 272 | 273 | 274 | 275 | 276 | 277 | 278 | 279 | 280 | 281 | 282 | 283 | 284 | 285 | 286 | 287 | 288 |
| 289 | 290 | 291 | 292 | 293 | 294 | 295 | 296 | 297 | 298 | 299 | 300 | 301 | 302 | 303 | 304 | 305 | 306 |
| 307 | 308 | 309 | 310 | 311 | 312 | 313 | 314 | 315 | 316 | 317 | 318 | 319 | 320 | 321 | 322 | 323 | 324 |
| 325 | 326 | 327 | 328 | 329 | 330 | 331 | 332 | 333 | 334 | 335 | 336 | 337 | 338 | 339 | 340 | 341 | 342 |
| 343 | 344 | 345 | 346 | 347 | 348 | 349 | 350 | 351 | 352 | 353 | 354 | 355 | 356 | 357 | 358 | 359 | 360 |
| 361 | 362 | 363 | 364 | 365 | 366 | 367 | 368 | 369 | 370 | 371 | 372 | 373 | 374 | 375 | 376 | 377 | 378 |
| 379 | 380 | 381 | 382 | 383 | 384 | 385 | 386 | 387 | 388 | 389 | 390 | 391 | 392 | 393 | 394 | 395 | 396 |
| 397 | 398 | 399 | 400 | 401 | 402 | 403 | 404 | 405 | 406 | 407 | 408 | 409 | 410 | 411 | 412 | 413 | 414 |
| 415 | 416 | 417 | 418 | 419 | 420 | 421 | 422 | 423 | 424 | 425 | 426 | 427 | 428 | 429 | 430 | 431 | 432 |
| 433 | 434 | 435 | 436 | 437 | 438 | 439 | 440 | 441 | 442 | 443 | 444 | 445 | 446 | 447 | 448 | 449 | 450 |
| 451 | 452 | 453 | 454 | 455 | 456 | 457 | 458 | 459 | 460 | 461 | 462 | 463 | 464 | 465 | 466 | 468 | 468 |

TABLE 5

| 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|
| 19 | 20 | 21 | 22 | 23 | 24 | 25 | 26 | 27 | 28 | 29 | 30 | 31 | 32 | 33 | 34 | 17 | 18 |
| 37 | 38 | 39 | 40 | 41 | 42 | 43 | 44 | 45 | 46 | 47 | 48 | 49 | 50 | 51 | 52 | 53 | 54 |
| 55 | 56 | 57 | 58 | 59 | 60 | 61 | 62 | 63 | 64 | 65 | 66 | 67 | 68 | 69 | 70 | 71 | 72 |
| 73 | 74 | 75 | 76 | 77 | 78 | 79 | 80 | 81 | 82 | 83 | 84 | 85 | 86 | 87 | 88 | 89 | 90 |
| 91 | 92 | 93 | 94 | 95 | 96 | 97 | 98 | 99 | 100 | 101 | 102 | 103 | 104 | 105 | 106 | 107 | 108 |
| 109 | 110 | 111 | 112 | 113 | 114 | 115 | 116 | 117 | 118 | 119 | 120 | 121 | 122 | 123 | 124 | 125 | 126 |
| 127 | 128 | 129 | 130 | 131 | 132 | 133 | 134 | 135 | 136 | 137 | 138 | 139 | 140 | 141 | 142 | 143 | 144 |
| 145 | 146 | 147 | 148 | 149 | 150 | 151 | 152 | 153 | 154 | 155 | 156 | 157 | 158 | 159 | 160 | 161 | 162 |
| 163 | 164 | 165 | 166 | 167 | 168 | 169 | 170 | 171 | 172 | 173 | 174 | 175 | 176 | 177 | 178 | 179 | 180 |
| 181 | 182 | 183 | 184 | 185 | 186 | 187 | 188 | 189 | 190 | 191 | 192 | 193 | 194 | 195 | 196 | 197 | 198 |
| 199 | 200 | 201 | 202 | 203 | 204 | 205 | 206 | 207 | 208 | 209 | 210 | 211 | 212 | 213 | 214 | 215 | 216 |
| 217 | 218 | 219 | 220 | 221 | 222 | 223 | 224 | 225 | 226 | 227 | 228 | 229 | 230 | 231 | 232 | 233 | 234 |

| 235 | 236 | 237 | 238 | 239 | 240 | 241 | 242 | 243 | 244 | 245 | 246 | 247 | 248 | 249 | 250 | 251 | 252 |
|---|---|---|---|---|---|---|---|---|---|---|---|---|---|---|---|---|---|
| 253 | 254 | 255 | 256 | 257 | 258 | 259 | 260 | 261 | 262 | 263 | 264 | 265 | 266 | 267 | 268 | 269 | 270 |
| 271 | 272 | 273 | 274 | 275 | 276 | 277 | 278 | 279 | 280 | 281 | 282 | 283 | 284 | 285 | 286 | 287 | 288 |
| 289 | 290 | 291 | 292 | 293 | 294 | 295 | 296 | 297 | 298 | 299 | 300 | 301 | 302 | 303 | 304 | 305 | 306 |
| 307 | 308 | 309 | 310 | 311 | 312 | 313 | 314 | 315 | 316 | 317 | 318 | 319 | 320 | 321 | 322 | 323 | 324 |
| 325 | 326 | 327 | 328 | 329 | 330 | 331 | 332 | 333 | 334 | 335 | 336 | 337 | 338 | 339 | 340 | 341 | 342 |
| 343 | 344 | 345 | 346 | 347 | 348 | 349 | 350 | 351 | 352 | 353 | 354 | 355 | 356 | 357 | 358 | 359 | 360 |
| 361 | 362 | 363 | 364 | 365 | 366 | 367 | 368 | 369 | 370 | 371 | 372 | 373 | 374 | 375 | 376 | 377 | 378 |
| 379 | 380 | 381 | 382 | 383 | 384 | 385 | 386 | 387 | 388 | 389 | 390 | 391 | 392 | 393 | 394 | 395 | 396 |
| 397 | 398 | 399 | 400 | 401 | 402 | 403 | 404 | 405 | 406 | 407 | 408 | 409 | 410 | 411 | 412 | 413 | 414 |
| 415 | 416 | 417 | 418 | 419 | 420 | 421 | 422 | 423 | 424 | 425 | 426 | 427 | 428 | 429 | 430 | 431 | 432 |
| 433 | 434 | 435 | 436 | 437 | 438 | 439 | 440 | 441 | 442 | 443 | 444 | 445 | 446 | 447 | 448 | 449 | 450 |
| 451 | 452 | 453 | 454 | 455 | 456 | 457 | 458 | 459 | 460 | 461 | 462 | 463 | 464 | 465 | 466 | 468 | 468 |

TABLE 6a

| 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|
| 19 | 20 | 21 | 22 | 23 | 24 | 25 | 26 | 27 | 28 | 29 | 30 | 31 | 32 | 33 | 34 | 17 | 18 |
| 37 | 38 | 39 | 40 | 41 | 42 | 43 | 44 | 45 | 46 | 47 | 48 | 49 | 50 | 51 | 52 | 53 | 54 |
| 55 | 56 | 57 | 58 | 59 | 60 | 61 | 62 | 63 | 64 | 65 | 66 | 67 | 68 | 69 | 70 | 71 | 72 |
| 73 | 74 | 75 | 76 | 77 | 78 | 79 | 80 | 81 | 82 | 83 | 84 | 85 | 86 | 87 | 88 | 89 | 90 |
| 91 | 92 | 93 | 94 | 95 | 96 | 97 | 98 | 99 | 100 | 101 | 102 | 103 | 104 | 105 | 106 | 107 | 108 |
| 109 | 110 | 111 | 112 | 113 | 114 | 115 | 116 | 117 | 118 | 119 | 120 | 121 | 122 | 123 | 124 | 125 | 126 |
| 127 | 128 | 129 | 130 | 131 | 132 | 133 | 134 | 135 | 136 | 137 | 138 | 139 | 140 | 141 | 142 | 143 | 144 |
| 145 | 146 | 147 | 148 | 149 | 150 | 151 | 152 | 153 | 154 | 155 | 156 | 157 | 158 | 159 | 160 | 161 | 162 |
| 163 | 164 | 165 | 166 | 167 | 168 | 169 | 170 | 171 | 172 | 173 | 174 | 175 | 176 | 177 | 178 | 179 | 180 |
| 181 | 182 | 183 | 184 | 185 | 186 | 187 | 188 | 189 | 190 | 191 | 192 | 193 | 194 | 195 | 196 | 197 | 198 |
| 199 | 200 | 201 | 202 | 203 | 204 | 205 | 206 | 207 | 208 | 209 | 210 | 211 | 212 | 213 | 214 | 215 | 216 |
| 217 | 218 | 219 | 220 | 221 | 222 | 223 | 224 | 225 | 226 | 227 | 228 | 229 | 230 | 231 | 232 | 233 | 234 |

| 235 | 236 | 237 | 238 | 239 | 240 | 241 | 242 | 243 | 244 | 245 | 246 | 247 | 248 | 249 | 250 | 251 | 252 |
|---|---|---|---|---|---|---|---|---|---|---|---|---|---|---|---|---|---|
| 253 | 254 | 255 | 256 | 257 | 258 | 259 | 260 | 261 | 262 | 263 | 264 | 265 | 266 | 267 | 268 | 269 | 270 |
| 271 | 272 | 273 | 274 | 275 | 276 | 277 | 278 | 279 | 280 | 281 | 282 | 283 | 284 | 285 | 286 | 287 | 288 |
| 289 | 290 | 291 | 292 | 293 | 294 | 295 | 296 | 297 | 298 | 299 | 300 | 301 | 302 | 303 | 304 | 305 | 306 |
| 307 | 308 | 309 | 310 | 311 | 312 | 313 | 314 | 315 | 316 | 317 | 318 | 319 | 320 | 321 | 322 | 323 | 324 |
| 325 | 326 | 327 | 328 | 329 | 330 | 331 | 332 | 333 | 334 | 335 | 336 | 337 | 338 | 339 | 340 | 341 | 342 |
| 343 | 344 | 345 | 346 | 347 | 348 | 349 | 350 | 351 | 352 | 353 | 354 | 355 | 356 | 357 | 358 | 359 | 360 |
| 361 | 362 | 363 | 364 | 365 | 366 | 367 | 368 | 369 | 370 | 371 | 372 | 373 | 374 | 375 | 376 | 377 | 378 |
| 379 | 380 | 381 | 382 | 383 | 384 | 385 | 386 | 387 | 388 | 389 | 390 | 391 | 392 | 393 | 394 | 395 | 396 |
| 397 | 398 | 399 | 400 | 401 | 402 | 403 | 404 | 405 | 406 | 407 | 408 | 409 | 410 | 411 | 412 | 413 | 414 |
| 415 | 416 | 417 | 418 | 419 | 420 | 421 | 422 | 423 | 424 | 425 | 426 | 427 | 428 | 429 | 430 | 431 | 432 |
| 433 | 434 | 435 | 436 | 437 | 438 | 439 | 440 | 441 | 442 | 443 | 444 | 445 | 446 | 447 | 448 | 449 | 450 |
| 451 | 452 | 453 | 454 | 455 | 456 | 457 | 458 | 459 | 460 | 461 | 462 | 463 | 464 | 465 | 466 | 467 | 468 |

TABLE 6b

| 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|
| 19 | 20 | 21 | 22 | 23 | 24 | 25 | 26 | 27 | 28 | 29 | 30 | 31 | 32 | 33 | 34 | 17 | 18 |
| 37 | 38 | 39 | 40 | 41 | 42 | 43 | 44 | 45 | 46 | 47 | 48 | 49 | 50 | 51 | 52 | 53 | 54 |
| 55 | 56 | 57 | 58 | 59 | 60 | 61 | 62 | 63 | 64 | 65 | 66 | 67 | 68 | 69 | 70 | 71 | 72 |
| 73 | 74 | 75 | 76 | 77 | 78 | 79 | 80 | 81 | 82 | 83 | 84 | 85 | 86 | 87 | 88 | 89 | 90 |
| 91 | 92 | 93 | 94 | 95 | 96 | 97 | 98 | 99 | 100 | 101 | 102 | 103 | 104 | 105 | 106 | 107 | 108 |
| 109 | 110 | 111 | 112 | 113 | 114 | 115 | 116 | 117 | 118 | 119 | 120 | 121 | 122 | 123 | 124 | 125 | 126 |
| 127 | 128 | 129 | 130 | 131 | 132 | 133 | 134 | 135 | 136 | 137 | 138 | 139 | 140 | 141 | 142 | 143 | 144 |
| 145 | 146 | 147 | 148 | 149 | 150 | 151 | 152 | 153 | 154 | 155 | 156 | 157 | 158 | 159 | 160 | 161 | 162 |
| 163 | 164 | 165 | 166 | 167 | 168 | 169 | 170 | 171 | 172 | 173 | 174 | 175 | 176 | 177 | 178 | 179 | 180 |
| 181 | 182 | 183 | 184 | 185 | 186 | 187 | 188 | 189 | 190 | 191 | 192 | 193 | 194 | 195 | 196 | 197 | 198 |
| 199 | 200 | 201 | 202 | 203 | 204 | 205 | 206 | 207 | 208 | 209 | 210 | 211 | 212 | 213 | 214 | 215 | 216 |
| 217 | 218 | 219 | 220 | 221 | 222 | 223 | 224 | 225 | 226 | 227 | 228 | 229 | 230 | 231 | 232 | 233 | 234 |

| 235 | 236 | 237 | 238 | 239 | 240 | 241 | 242 | 243 | 244 | 245 | 246 | 247 | 248 | 249 | 250 | 251 | 252 |
|---|---|---|---|---|---|---|---|---|---|---|---|---|---|---|---|---|---|
| 253 | 254 | 255 | 256 | 257 | 258 | 259 | 260 | 261 | 262 | 263 | 264 | 265 | 266 | 267 | 268 | 269 | 270 |
| 271 | 272 | 273 | 274 | 275 | 276 | 277 | 278 | 279 | 280 | 281 | 282 | 283 | 284 | 285 | 286 | 287 | 288 |
| 289 | 290 | 291 | 292 | 293 | 294 | 295 | 296 | 297 | 298 | 299 | 300 | 301 | 302 | 303 | 304 | 305 | 306 |
| 307 | 308 | 309 | 310 | 311 | 312 | 313 | 314 | 315 | 316 | 317 | 318 | 319 | 320 | 321 | 322 | 323 | 324 |
| 325 | 326 | 327 | 328 | 329 | 330 | 331 | 332 | 333 | 334 | 335 | 336 | 337 | 338 | 339 | 340 | 341 | 342 |
| 343 | 344 | 345 | 346 | 347 | 348 | 349 | 350 | 351 | 352 | 353 | 354 | 355 | 356 | 357 | 358 | 359 | 360 |
| 361 | 362 | 363 | 364 | 365 | 366 | 367 | 368 | 369 | 370 | 371 | 372 | 373 | 374 | 375 | 376 | 377 | 378 |
| 379 | 380 | 381 | 382 | 383 | 384 | 385 | 386 | 387 | 388 | 389 | 390 | 391 | 392 | 393 | 394 | 395 | 396 |
| 397 | 398 | 399 | 400 | 401 | 402 | 403 | 404 | 405 | 406 | 407 | 408 | 409 | 410 | 411 | 412 | 413 | 414 |
| 415 | 416 | 417 | 418 | 419 | 420 | 421 | 422 | 423 | 424 | 425 | 426 | 427 | 428 | 429 | 430 | 431 | 432 |
| 433 | 434 | 435 | 436 | 437 | 438 | 439 | 440 | 441 | 442 | 443 | 444 | 445 | 446 | 447 | 448 | 449 | 450 |
| 451 | 452 | 453 | 454 | 455 | 456 | 457 | 458 | 459 | 460 | 461 | 462 | 463 | 464 | 465 | 466 | 468 | 468 |

TABLE 6c

| | | | | | | | | | | | | | | | | | |
|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 |
| 19 | 20 | 21 | 22 | 23 | 24 | 25 | 26 | 27 | 28 | 29 | 30 | 31 | 32 | 33 | 34 | 17 | 18 |
| 37 | 38 | 39 | 40 | 41 | 42 | 43 | 44 | 45 | 46 | 47 | 48 | 49 | 50 | 51 | 52 | 53 | 54 |
| 55 | 56 | 57 | 58 | 59 | 60 | 61 | 62 | 63 | 64 | 65 | 66 | 67 | 68 | 69 | 70 | 71 | 72 |
| 73 | 74 | 75 | 76 | 77 | 78 | 79 | 80 | 81 | 82 | 83 | 84 | 85 | 86 | 87 | 88 | 89 | 90 |
| 91 | 92 | 93 | 94 | 95 | 96 | 97 | 98 | 99 | 100 | 101 | 102 | 103 | 104 | 105 | 106 | 107 | 108 |
| 109 | 110 | 111 | 112 | 113 | 114 | 115 | 116 | 117 | 118 | 119 | 120 | 121 | 122 | 123 | 124 | 125 | 126 |
| 127 | 128 | 129 | 130 | 131 | 132 | 133 | 134 | 135 | 136 | 137 | 138 | 139 | 140 | 141 | 142 | 143 | 144 |
| 145 | 146 | 147 | 148 | 149 | 150 | 151 | 152 | 153 | 154 | 155 | 156 | 157 | 158 | 159 | 160 | 161 | 162 |
| 163 | 164 | 165 | 166 | 167 | 168 | 169 | 170 | 171 | 172 | 173 | 174 | 175 | 176 | 177 | 178 | 179 | 180 |
| 181 | 182 | 183 | 184 | 185 | 186 | 187 | 188 | 189 | 190 | 191 | 192 | 193 | 194 | 195 | 196 | 197 | 198 |
| 199 | 200 | 201 | 202 | 203 | 204 | 205 | 206 | 207 | 208 | 209 | 210 | 211 | 212 | 213 | 214 | 215 | 216 |
| 217 | 218 | 219 | 220 | 221 | 222 | 223 | 224 | 225 | 226 | 227 | 228 | 229 | 230 | 231 | 232 | 233 | 234 |

| | | | | | | | | | | | | | | | | | |
|---|---|---|---|---|---|---|---|---|---|---|---|---|---|---|---|---|---|
| 235 | 236 | 237 | 238 | 239 | 240 | 241 | 242 | 243 | 244 | 245 | 246 | 247 | 248 | 249 | 250 | 251 | 252 |
| 253 | 254 | 255 | 256 | 257 | 258 | 259 | 260 | 261 | 262 | 263 | 264 | 265 | 266 | 267 | 268 | 269 | 270 |
| 271 | 272 | 273 | 274 | 275 | 276 | 277 | 278 | 279 | 280 | 281 | 282 | 283 | 284 | 285 | 286 | 287 | 288 |
| 289 | 290 | 291 | 292 | 293 | 294 | 295 | 296 | 297 | 298 | 299 | 300 | 301 | 302 | 303 | 304 | 305 | 306 |
| 307 | 308 | 309 | 310 | 311 | 312 | 313 | 314 | 315 | 316 | 317 | 318 | 319 | 320 | 321 | 322 | 323 | 324 |
| 325 | 326 | 327 | 328 | 329 | 330 | 331 | 332 | 333 | 334 | 335 | 336 | 337 | 338 | 339 | 340 | 341 | 342 |
| 343 | 344 | 345 | 346 | 347 | 348 | 349 | 350 | 351 | 352 | 353 | 354 | 355 | 356 | 357 | 358 | 359 | 360 |
| 361 | 362 | 363 | 364 | 365 | 366 | 367 | 368 | 369 | 370 | 371 | 372 | 373 | 374 | 375 | 376 | 377 | 378 |
| 379 | 380 | 381 | 382 | 383 | 384 | 385 | 386 | 387 | 388 | 389 | 390 | 391 | 392 | 393 | 394 | 395 | 396 |
| 397 | 398 | 399 | 400 | 401 | 402 | 403 | 404 | 405 | 406 | 407 | 408 | 409 | 410 | 411 | 412 | 413 | 414 |
| 415 | 416 | 417 | 418 | 419 | 420 | 421 | 422 | 423 | 424 | 425 | 426 | 427 | 428 | 429 | 430 | 431 | 432 |
| 433 | 434 | 435 | 436 | 437 | 438 | 439 | 440 | 441 | 442 | 443 | 444 | 445 | 446 | 447 | 448 | 449 | 450 |
| 451 | 452 | 453 | 454 | 455 | 456 | 457 | 458 | 459 | 460 | 461 | 462 | 463 | 464 | 465 | 466 | 467 | 468 |

TABLE 7

| 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|----|----|----|----|----|----|----|----|----|
| 19 | 20 | 21 | 22 | 23 | 24 | 25 | 26 | 27 | 28 | 29 | 30 | 31 | 32 | 33 | 34 | 17 | 18 |
| 37 | 38 | 39 | 40 | 41 | 42 | 43 | 44 | 45 | 46 | 47 | 48 | 49 | 50 | 51 | 52 | 53 | 54 |
| 55 | 56 | 57 | 58 | 59 | 60 | 61 | 62 | 63 | 64 | 65 | 66 | 67 | 68 | 69 | 70 | 71 | 72 |
| 73 | 74 | 75 | 76 | 77 | 78 | 79 | 80 | 81 | 82 | 83 | 84 | 85 | 86 | 87 | 88 | 89 | 90 |
| 91 | 92 | 93 | 94 | 95 | 96 | 97 | 98 | 99 | 100 | 101 | 102 | 103 | 104 | 105 | 106 | 107 | 108 |
| 109 | 110 | 111 | 112 | 113 | 114 | 115 | 116 | 117 | 118 | 119 | 120 | 121 | 122 | 123 | 124 | 125 | 126 |
| 127 | 128 | 129 | 130 | 131 | 132 | 133 | 134 | 135 | 136 | 137 | 138 | 139 | 140 | 141 | 142 | 143 | 144 |
| 145 | 146 | 147 | 148 | 149 | 150 | 151 | 152 | 153 | 154 | 155 | 156 | 157 | 158 | 159 | 160 | 161 | 162 |
| 163 | 164 | 165 | 166 | 167 | 168 | 169 | 170 | 171 | 172 | 173 | 174 | 175 | 176 | 177 | 178 | 179 | 180 |
| 181 | 182 | 183 | 184 | 185 | 186 | 187 | 188 | 189 | 190 | 191 | 192 | 193 | 194 | 195 | 196 | 197 | 198 |
| 199 | 200 | 201 | 202 | 203 | 204 | 205 | 206 | 207 | 208 | 209 | 210 | 211 | 212 | 213 | 214 | 215 | 216 |
| 217 | 218 | 219 | 220 | 221 | 222 | 223 | 224 | 225 | 226 | 227 | 228 | 229 | 230 | 231 | 232 | 233 | 234 |
| 235 | 236 | 237 | 238 | 239 | 240 | 241 | 242 | 243 | 244 | 245 | 246 | 247 | 248 | 249 | 250 | 251 | 252 |
| 253 | 254 | 255 | 256 | 257 | 258 | 259 | 260 | 261 | 262 | 263 | 264 | 265 | 266 | 267 | 268 | 269 | 270 |
| 271 | 272 | 273 | 274 | 275 | 276 | 277 | 278 | 279 | 280 | 281 | 282 | 283 | 284 | 285 | 286 | 287 | 288 |
| 289 | 290 | 291 | 292 | 293 | 294 | 295 | 296 | 297 | 298 | 299 | 300 | 301 | 302 | 303 | 304 | 305 | 306 |
| 307 | 308 | 309 | 310 | 311 | 312 | 313 | 314 | 315 | 316 | 317 | 318 | 319 | 320 | 321 | 322 | 323 | 324 |
| 325 | 326 | 327 | 328 | 329 | 330 | 331 | 332 | 333 | 334 | 335 | 336 | 337 | 338 | 339 | 340 | 341 | 342 |
| 343 | 344 | 345 | 346 | 347 | 348 | 349 | 350 | 351 | 352 | 353 | 354 | 355 | 356 | 357 | 358 | 359 | 360 |
| 361 | 362 | 363 | 364 | 365 | 366 | 367 | 368 | 369 | 370 | 371 | 372 | 373 | 374 | 375 | 376 | 377 | 378 |
| 379 | 380 | 381 | 382 | 383 | 384 | 385 | 386 | 387 | 388 | 389 | 390 | 391 | 392 | 393 | 394 | 395 | 396 |
| 397 | 398 | 399 | 400 | 401 | 402 | 403 | 404 | 405 | 406 | 407 | 408 | 409 | 410 | 411 | 412 | 413 | 414 |
| 415 | 416 | 417 | 418 | 419 | 420 | 421 | 422 | 423 | 424 | 425 | 426 | 427 | 428 | 429 | 430 | 431 | 432 |
| 433 | 434 | 435 | 436 | 437 | 438 | 439 | 440 | 441 | 442 | 443 | 444 | 445 | 446 | 447 | 448 | 449 | 450 |
| 451 | 452 | 453 | 454 | 455 | 456 | 457 | 458 | 459 | 460 | 461 | 462 | 463 | 464 | 465 | 466 | 467 | 468 |

The invention claimed is:

1. A method of delayed reading of digital video data stored in a file on a recording medium, comprising:
   reserving, on said recording medium, a predetermined quantity of resources to said file intended for delayed reading of data, based on resources already used, said reserved resources being located anywhere on said recording medium;
   writing said data of said file in said resources, a write pointer indicating the write position, said writing comprises using said reserved resources on the recording medium;
   reading said data of said file in said resources, a read pointer indicating the read position; and,
   further to a writing of data of said file in said resources, when all reserved resources are allocated,
      deallocating a predetermined quantity of allocated resources depending on the size of the file and on a delay between said read and write pointer, said deallocated predetermined quantity of resources being the cells of the files written first,
      reserving new resources, not part of the previously reserved predetermined quantity of resources, for said file,
      said deallocation and reserving of new resources keeping constant the size of said file to said predetermined quantity of reserved resources.

2. Method according to claim 1, wherein, the data being stored continuously on the recording medium, a reading window is defined for these data such that stored data can be read only during a specified lag following their storage.

3. Method according to claim 2, the resources of the recording medium being managed by a file controller allotting resources by means of cells, wherein a fixed quantity of cells delimited by a start of file cell and by an end of file cell is associated with the file for storing these data.

4. Method according to claim 3, wherein, when the end of file cell is used to store data, the start of file cell is deallocated, a new end of file cell being allocated to this file.

5. Method according to claim 4 wherein separate means of writing or of reading data are used.

6. Method according to claim 3, wherein, when the end of file cell is used to store data, the set of the cells that are distant from the end of file cell by a specified quantity of data is deallocated from the file and reallocated as cells consecutively following the end of file cell.

7. Method according to claim 6 wherein separate means of writing or of reading data are used.

8. Method according to claim 7, the means of reading or of writing comprising, respectively, write or read pointers wherein the write pointer precedes the read pointer for every cell of a file.

9. Method according to claim 3 wherein separate means of writing or of reading data are used.

10. Method according to claim 9, the means of reading or of writing comprising, respectively, write or read pointers wherein the write pointer precedes the read pointer for every cell of a file.

11. Method according to claim 1, the resources of the recording medium being managed by a file controller allotting resources by means of cells, wherein a fixed quantity of cells delimited by a start of file cell and by an end of file cell is associated with the file for storing these data.

12. Method according to claim 11, wherein, when the end of file cell is used to store data, the start of file cell is deallocated, a new end of file cell being allocated to this file.

13. Method according to claim 12 wherein separate means of writing or of reading data are used.

14. Method according to claim 13, the means of reading or of writing comprising, respectively, write or read pointers wherein the write pointer precedes the read pointer for every cell of a file.

15. Method according to claim 11, wherein, when the end of file cell is used to store data, the set of the cells that are distant from the end of file cell by a specified quantity of data is deallocated from the file and reallocated as cells consecutively following the end of file cell.

16. Method according to claim 15 wherein separate means of writing or of reading data are used.

17. Method according to claim 11 wherein separate means of writing or of reading data are used.

18. Method according to claim 17, the means of reading or of writing comprising, respectively, write or read pointers wherein the write pointer precedes the read pointer for every cell of a file.

19. Method according to claim 1, wherein the deallocating at the beginning of file, a predetermined quantity of resources depending on the size of the file and on a delay between said read and write pointer is performed when said write pointer reaches the end of file.

20. Method according to claim 1, wherein the deallocating at the beginning of file, a predetermined quantity of resources depending on the size of the file and on a delay between said read and write pointer is performed before each write access in said file.

21. Device for delayed reading of digital video data stored on a recording medium, comprising means for allocating a fixed quantity of the storage resources of the recording medium to the file storing these data, wherein said file is a sliding window on the recording medium, the device preferably being adapted to implement a method according to claim 1.

22. A non-transitory computer readable medium encoded with a computer program, said program for performing the method of delayed reading of digital video data according to claim 1.

* * * * *